United States Patent [19]
Kunst et al.

[11] 3,738,463
[45] June 12, 1973

[54] BRAKE OR CLUTCH LINING

[75] Inventors: Helmut Kunst, Osterholz-Scharmbeck; Heinrich Wasels, Altena, both of Germany

[73] Assignees: Institute fur Harterei-Teehnik, Lesumer; Heinrich Wasels, Altena (Westphalia) Klusenstrasse, both of Germany

[22] Filed: Mar. 11, 1971

[21] Appl. No.: 123,222

[30] Foreign Application Priority Data
Feb. 13, 1970 Germany.................. P 20 06 540.1

[52] U.S. Cl.............. 192/107 M, 148/6, 148/31.5, 188/218 R, 188/251, 192/75
[51] Int. Cl............................................ F16d 69/02
[58] Field of Search .................... 148/6.14, 6, 31.5, 148/6.3, 6, 31.5, 16.5, 16.6; 188/218, 251; 192/107, 108; 75/202

[56] References Cited
UNITED STATES PATENTS

| | | | |
|---|---|---|---|
| 1,966,130 | 7/1934 | Norton................................ | 148/19 |
| 3,282,746 | 11/1966 | Zlotek et al. .................. | 148/16.5 X |
| 1,746,924 | 2/1930 | Bendix ........................... | 188/218 R |
| 2,925,896 | 2/1960 | Jaeschke ..................... | 192/107 M X |
| 3,306,741 | 2/1967 | Lallemant........................ | 75/202 X |

OTHER PUBLICATIONS
Chem. Abstracts Vol. 68: 107150e (1968).
Chem. Abstracts Vol. 69: 60988n (1968).

*Primary Examiner*—Ralph S. Kendall
*Attorney*—Francis M. Crawford

[57] ABSTRACT

The present invention relates to brakes or clutches having the frictional surfaces thereof boronized on one or both of the braking or clutching surfaces.

4 Claims, 2 Drawing Figures

INVENTOR.
HELMUT KUNST
AND
HEINRICH WASELS

BY
FRANCIS M. CRAWFORD

BRAKE OR CLUTCH LINING

The present invention relates to brakes or clutches having at least two friction surfaces, that is, two surfaces which when pressed upon each other restrict the movement of the moving parts.

Numerous attempts have been made in the past to construct brakes and clutches wherein the braking and clutching surfaces exhibited improved properties with respect in particular to mechanical and thermal stresses and strains without at the same time unduly increasing the cost of construction and repair. Among such, attention might be called to German Pat. No. 1,026,644 which describes the coating of the breaking surfaces of brake drums with a light metal, such as molybdenum, by spraying or precipitation from the vapor phase. Such methods have been subject to various disadvantages not present in the improved method which is the subject of the present invention.

According to the present invention, the frictional surfaces of brakes or clutches are constructed in a manner such that they are able to take much heavier loads, have a longer useful life and can be produced more economically. This improvement is effected by coating at least one of the frictional surfaces of the brake or clutch with a boride layer, preferably by boronizing by conventional methods.

The boronizing of metal surfaces is well known being frequently resorted to when it is desired to produce hard surfaces. It was surprising to discover, however, that such boronized metal surfaces were highly effective as friction surfaces in brakes and clutches, resulting from the unexpected discovery that such surfaces have an unusually high frictional coefficient. This is especially when boronized iron metal surfaces are used. It was found upon investigation that this surprising property is apparently due to the special crystal structure of the iron boride layer formed upon the boronized iron metal surface, the boride crystals being formed on the supporting iron metal surface in a manner so that the individual iron boride crystals will protrude from the surface to different heights. An uneven surface having protusions and recesses is thus formed, with the result that the frictional coefficient of the surface is materially increased.

It has further been discovered that the individual boride crystals penetrate the supporting iron metal in the form of teeth and are thus anchored therein, giving an increased advantage to the use of boronized iron surfaces as frictional surfaces for brakes and clutches. Still another advantage in the use of frictional surfaces prepared in this manner results from the fact that boride layers which have penetrated by diffusion are quite hard, resistant to thermal stresses, as well as to abrasion, thus making them particularly desirable for use as frictional surfaces for brake and clutch surfaces.

In producing the improved frictional surfaces of the present invention the boride layer may be produced upon brake or clutch parts produced from castable metal alloys, such as malleable cast iron, gray cast iron or other such alloys, as well as from sintered metals. Among the metals which are particularly suitable may be mentioned the thermally refined low alloy or even unalloyed steels, which have good thermal conductance and hence are able to conduct away heat rapidly from the surfaces as formed. In this connection it might be noted that the coefficient of thermal expansion of the boride layer is so similar to that of the low alloy or unalloyed steels that even when highly heated splitting off of the boride layer due to differences in expansion does not take place to any particular degree.

To further illustrate our improved invention reference is made to the attached drawings.

It is understood that the invention illustrated by the above FIGS. can be applied to all types of brakes or clutches having friction surfaces.

Figure 1:
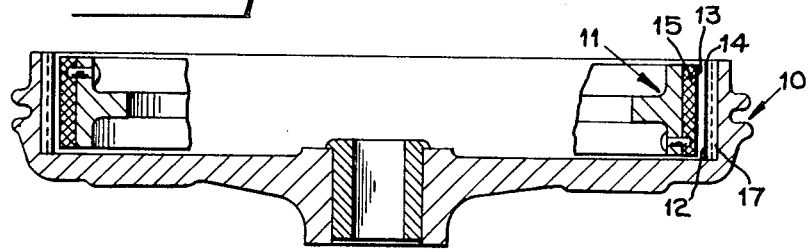
FIG. 1 shows parts of a brake drum, to illustrate one possible application of our invention.

In FIG. 1 showing a brake drum section 10 containing a brake shoe 11 located inside of the brake drum. The faces of the brake drum 10 and brake shoe 11, which face each other, can be pressed upon each other along the braking surfaces 12 and 13. At least one of these braking surfaces 12 and 13 is produced in accordance with the present invention, that is, is coated with a boride layer 14. As a typical example, the braking surface of the braking drum 10 is coated with a boride layer 14, whereas the brake shoe 11 carries a conventional type brake liner 15 to provide the braking surface 13.

Figure 2:
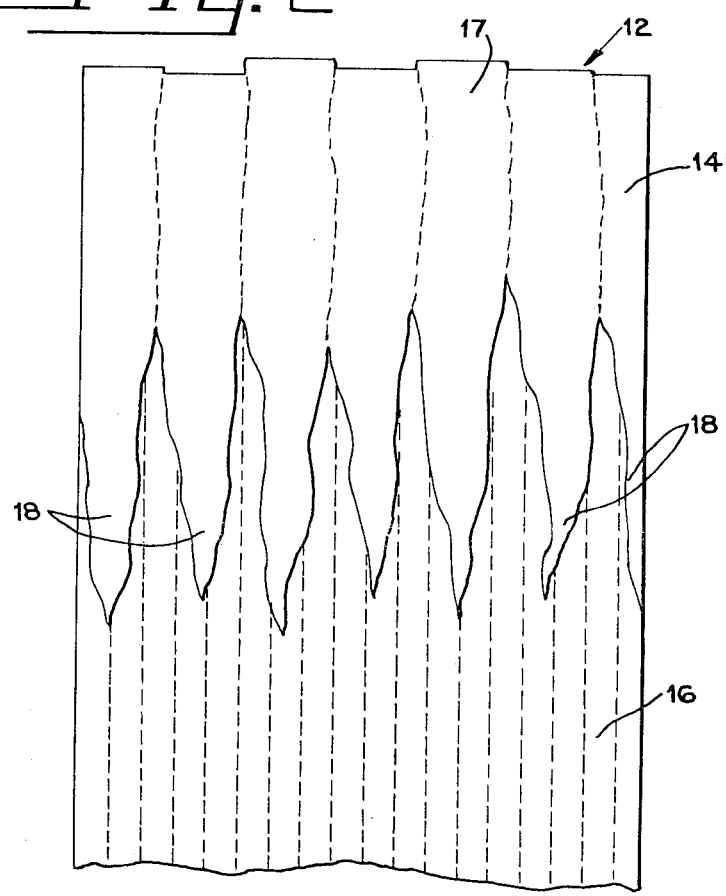
FIG. 2 shows, on an enlarged scale, a section of the friction surface illustrated in FIG. 1.

The boride layer 14, shown in enlarged scale in FIG. 2, is produced by diffusion upon the supporting material, that is, the part 16 of the brake or clutch, in a manner so that the boride crystals 17 are produced vertical to the braking face. These boride crystals 17 are anchored into the supporting material by tooth-like ends 18, that is, anchored with such teeth inside the brake or clutch portion 16, so that the boride layer 14 is effectively bonded to the supporting material.

FIG. 2 also illustrates the fact that the boride crystals 17 do not form a smooth surface in which all of the crystals are flush with each other. Instead, they form the braking surface 12 in which the boride crystals are present in staggered heights with size differences of the order of about 2 microns. It is this difference in surface structure which gives the unusually favorable coefficient of friction and facilitates the removal of heat formed by the braking action, due to the increased surface.

The supporting material 16 of the brake or clutch is preferably a metal which can be cast in molds, such as malleable cast iron, gray iron, spheroidal-graphite iron castings, sintered metals or similar materials. Particularly suitable are the thermally refined low alloyed or unalloyed steels, which permit excellent removal of heat by conduction.

In the modification illustrated by FIG. 1 the brake drum 10 may consist of any suitable material, such as aluminum. Into the brake drum 10 is inserted a supporting ring 17, by shrinking or other suitable means. This area of the supporting ring 17 which faces the brake shoe 11 serves as the braking face 12 and is provided with the boride layer 14. The supporting ring 17 can be any of the materials listed above as suitable supporting materials for the boride layer.

What is claimed is:

1. Brake or clutch containing two friction faces comprising a ferrous metal base, which can be pressed against each other, at least one of said friction faces being coated with a boron layer applied by diffusion boronizing, the boron being formed on the supporting metal surface in the form of teeth anchored therein and which protrude from the surface of said supporting metal to different heights.

2. Brake or clutch according to claim 1 wherein said boron layer is applied to a supporting metal selected from the group consisting of malleable cast iron, gray iron, spheroidal-graphite iron castings, steels, low alloyed steels and sintered steels.

3. Brake or clutch according to claim 1 wherein said boron layer is in the form of boride crystals produced vertical to the frictional surface, and said crystals being anchored into the supporting material by tooth-like ends whereby said boride crystals are effectively bonded to said frictional surface.

4. Brake or clutch according to claim 1 wherein said boron layer is in the form of boride crystals produced vertical to the frictional surface and are in staggered heights with size differences of the order of about 2 microns.

* * * * *